Patented Dec. 13, 1938

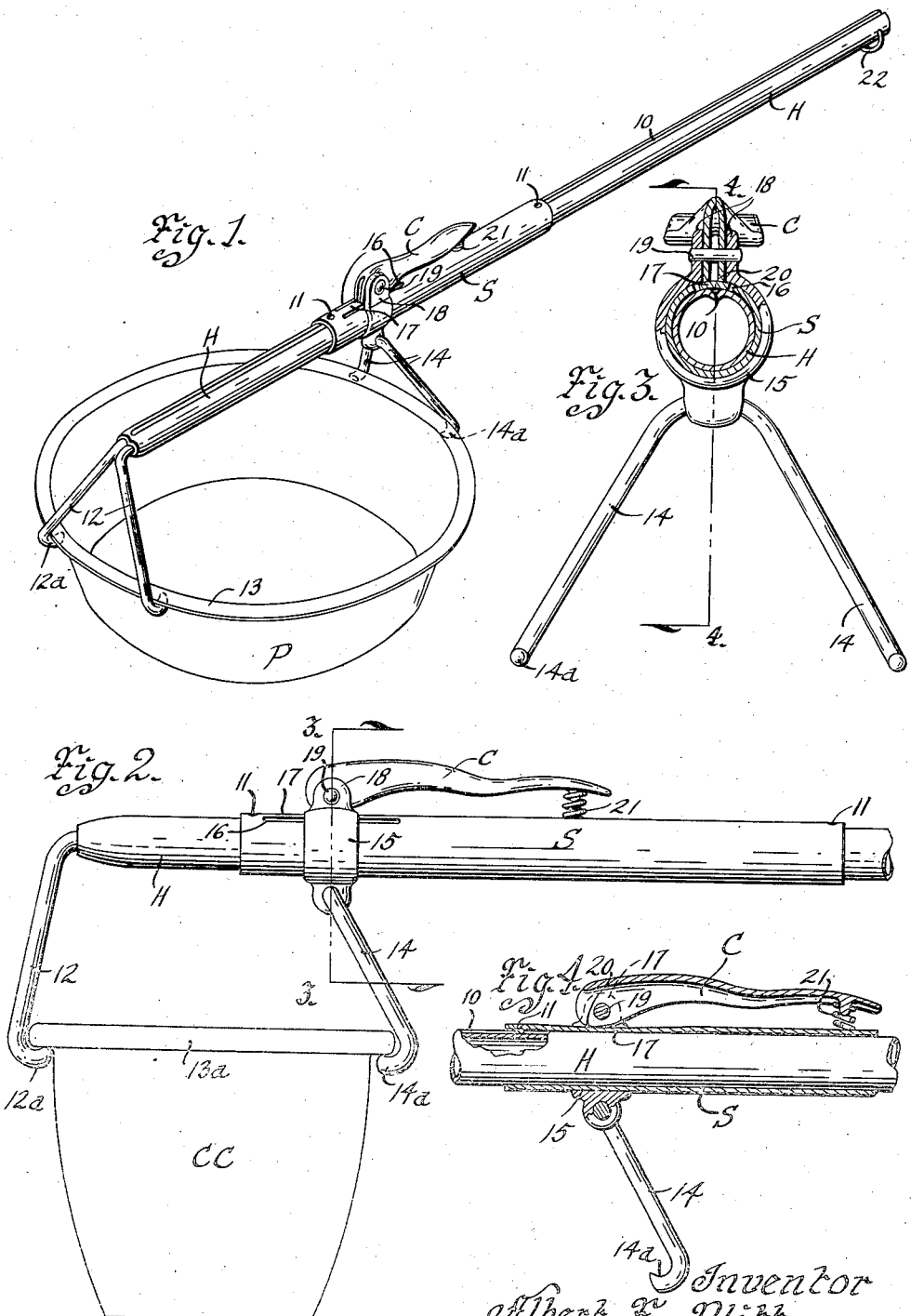

2,140,165

UNITED STATES PATENT OFFICE 2,140,165

DETACHABLE HANDLE

Albert F. Plitt, Canton, Ohio

Application June 9, 1937, Serial No. 147,261

3 Claims. (Cl. 294—34)

An object of my invention is to provide a detachable handle for cooking utensils or the like which is simple, durable and comparatively inexpensive to manufacture.

A further object is to provide a handle member for cooking utensils which is readily adaptable for supporting either small custard cups or large dish pans and which is readily adjustable for any intermediate size of cooking utensil or the like.

Another object is to provide a handle comprising an elongated member having a pair of rim engaging hooks on one end thereof and a member slidable relative thereto which also has a pair of hooks, the latter hooks being engageable with the opposite side of a rim and being movable toward and away from the first hooks whereby to adjust the handle for any desired size of cooking utensil.

Another object is to provide means for locking the hooks at adjusted positions comprising a cam biased to cause engagement between the member which carries one set of hooks and the elongated handle member.

With these and other objects in view, my invention consists in the construction, arrangement and combination of the various parts of the device, whereby the objects contemplated are attained, as hereinafter more fully set forth, pointed out in my claims and illustrated in the accompanying drawing, in which:

Figure 1 is a perspective view of my detachable handle for cooking utensils and the like showing it supporting a cake pan.

Figure 2 is an enlarged side elevation of the same showing it supporting a custard cup, a portion of the handle being broken off to conserve space on the drawing.

Figure 3 is an enlarged sectional view on the line 3—3 of Figure 2 showing the locking mechanism; and Figure 4 is a sectional view on the line 4—4 of Figure 3 showing details of the locking mechanism.

On the accompanying drawing I have used the reference character H to indicate an elongated handle element and S a slidable member. The slidable member S is tubular and the handle member H may also be tubular.

The handle member H is preferably provided with a longitudinal groove 10 while the slidable member S is provided with a pair of depressions or indentations 11 cooperating therewith to prevent rotation of the member S relative to the handle H. The end of the handle H carries a pair of hook arms 12 for engagement with the rim 13 of a pan P or other cooking utensil. The slidable member S is likewise provided with a pair of hook arms indicated at 14 for engagement with the opposite side of the rim. The arms 14 are carried by a split band 15 which is soldered or otherwise secured to the slidable member S.

The slidable member S has a pair of slots 16 cut therein so that a segment 17 of the tube S is movable relative to the major portion of the tube for locking purposes as will hereinafter appear. The split band 15 is provided with a pair of ears 18 for supporting a pivot pin 19. A cam lever C is pivoted on the pin 19 and has cam surfaces 20 engaging with the segment 17. A spring 21 biases the cam lever C to position with the segment 17 frictionally engaging the upper surface of the handle H as shown in Figure 4.

When the lever C is depressed by a finger or thumb of the operator against the action of the spring 21, the cam surface 20 of the cam is raised so that the frictional engagement between the segment 17 and the handle H is terminated, thereby unlocking the member S so that it can be readily slid relative to the handle H. In this manner, the hook arms 14 may be adjusted toward the arms 12 for fitting a smaller cooking utensil such as the custard cup CC illustrated in Figure 2.

My detachable handle may be readily adjusted and quickly operated to support or be removed from supporting engagement with a cooking utensil with a minimum of time and effort. It serves as a very convenient means especially to remove a hot baking dish from the oven with assurance that the dish will be rigidly supported against any possibility of becoming disengaged from the detachable handle device as the spring 21 through the leverage of the cam C locks the member S rigidly relative to the handle H.

If desired, the handle H may be provided with a ring 22 so that the handle can be hung up when not in use. This also serves the purpose of preventing the member S from becoming detached from the handle H.

Some changes may be made in the construction and arrangement of the parts of my device without departing from the real spirit and purpose of my invention, and it is my intention to cover by my claims, any modified forms of structure or use of mechanical equivalents which may be reasonably included within their scope.

I claim as my invention:

1. In a device of the class described, an elongated handle element, a tubular member slidable thereon, hook arms extending from one end of said elongated handle element and from said tubular member for supporting engagement with opposite sides of a cooking utensil or the like and a cam biased to engage with a segment of said tubular member to lock the tubuular member relative to the elongated handle element.

2. In a device of the class described, an elongated handle element, a tubular member slidable thereon, hook arms extending from one end of said elongated handle element and from said tubular member for supporting engagement with opposite sides of a cooking utensil or the like, said tubular member having parallel slits, a pair of bearing supports attached to the tubular member adjacent the slits, a cam element independent of said handle having a cam face lying between said parallel slits pivoted in the bearing supports and having an end extending longitudinally of said tubular member and a spring between the tubular member and the cam element adapted to constantly bias said cam to a normally clamped position.

3. In a device of the class described, an elongated handle element, a tubular member slidable thereon, hook arms extending from one end of said elongated handle element and from said tubuluar member for supporting engagement with opposite sides of a cooking utensil or the like, said handle element having a groove running lengthwise thereof forming a pair of parallel corners at the edges of said groove, said tubular member having projection means extending into said groove to prevent rotation between the handle element and the tubular member and a pair of slits defining a flexible portion therebetween lying adjacent said corners, and a locking device comprising a cam biased against said flexible portion to force said portion against the corners of said groove in order to lock the tubular member upon said handle element.

ALBERT F. PLITT.